UNITED STATES PATENT OFFICE.

BERTRAND S. SUMMERS, OF CHICAGO, ILLINOIS.

PROCESS OF PREPARING VEGETABLE FIBERS.

SPECIFICATION forming part of Letters Patent No. 650,917, dated June 5, 1900.

Application filed July 28, 1898. Renewed November 3, 1899. Serial No. 735,717. (No specimens.)

*To all whom it may concern:*

Be it known that I, BERTRAND S. SUMMERS, a citizen of the United States, residing at Chicago, in the county of Cook and State of Illinois, have invented a certain new and useful Improvement in Processes of Preparing Vegetable Fibers, of which the following is a full, clear, concise, and exact description.

My invention relates to a process for preparing vegetable fibers, being more particularly applicable to the preparation of flax fibers, although it is applicable to other fibers as well.

My object is to provide a process whereby the gum and cementing material which are present in the natural state may be effectively and economically removed to leave the fibers in a separated and refined condition.

The fibers to be prepared are in accordance with the present invention immersed in a solution containing a soluble salt of hydrofluoric acid and subjected to the chemical or solvent action thereof to thereby remove the gum and other cementing material. I have employed in practice sodium fluorid and potassium fluorid and have also used fluorids of tin and lead. Where commercial fluorids are employed, I preferably add a small quantity of hydrofluoric acid to the solution to convert any carbonates or other salts into fluorids. The solution is in practice subjected to pressure, usually about one hundred pounds gage pressure, as the process is thereby greatly expedited and facilitated. The solution and the fibers to be degummed and prepared are placed in a vat or digester adapted to be sealed in any manner, and by means of steam-coils or otherwise the solution is heated, usually to a temperature ranging from 300° to 335° Fahrenheit, the steam generated within the sealed vessel serving to subject the solution to the desired pressure.

In preparing flax I have employed the proportion of one hundred and thirty grams of commercial sodium fluorid to thirteen liters of water, usually adding thirteen cubic centimeters of commercial hydrofluoric acid to the solution. The flax-stalks are immersed in the crude state and at a pressure of about one hundred pounds gage pressure and at a temperature of about 335° Fahrenheit. The process takes usually about thirty minutes. In the absence of the pressure above the atmosphere, however, the process takes from six to eight hours. The solution, besides removing the gum binding the fibers together, removes the outer skin and removes the cementing material between the fibers and the wood and makes the wood brittle. At the end of this operation the fibers are removed from the solution and washed in water or an aqueous soap solution, distilled water being preferably employed, the water being usually heated under pressure to expedite the operation and to prevent violent ebullition, which would tend to entangle the fibers. I have, however, used ordinary hydrant-water for the washing process with good effect. If washed under pressure, a period of fifteen minutes will suffice, while if not under pressure the period should be practically doubled. After being washed the fibers are dried in any of the usual ways and then passed through breaking-rollers and scutched, after which the fibers are ready for carding and use in the textile arts.

By the term "chemical or solvent action" as employed herein I contemplate any action of a solution of a chemical or physical nature as distinguished from an electrochemical action.

Having described my invention, what I claim as new, and desire to secure by Letters Patent, is—

1. The herein-described process of preparing vegetable fibers, which consists in subjecting the fibers to the chemical or solvent action of a solution containing a soluble salt of hydrofluoric acid, substantially as described.

2. The herein-described process of preparing vegetable fibers, which consists in subjecting the fibers to the chemical or solvent action of a solution containing a soluble salt of hydrofluoric acid under pressure in excess of atmospheric pressure, substantially as described.

3. The herein-described process of preparing vegetable fibers, which consists in subjecting the fibers to the chemical or solvent action of a solution containing a soluble salt of hydrofluoric acid and a small quantity of hydrofluoric acid sufficient to convert any foreign salts into salts of hydrofluoric acid, substantially as described.

4. The herein-described process of preparing flax and similar fiber, which consists in subjecting the stalks in the crude and natural state to the chemical or solvent action of a solution containing a soluble salt of hydrofluoric acid and a small quantity of hydrofluoric acid sufficient to convert any foreign salts into salts of hydrofluoric acid, and then subjecting the fibers to a washing-bath, substantially as described.

In witness whereof I have hereunto subscribed my name in the presence of two witnesses.

BERTRAND S. SUMMERS.

Witnesses:
H. R. KINGMAN,
W. CLYDE JONES.